3,168,516
2'-DI(LOWER)ALKYLAMINOTHIAZOLO[4',5'-11,12]-PREGN-11-ENE-3,20-DIOL AND 3,20-DI(LOWER)-ALKANOATE THEREOF
Junichi Kawanami, Toyonaka-shi, Osaka, Japan, assignor to Shionogi & Co., Ltd., Osaka, Japan
No Drawing. Filed May 27, 1963, Ser. No. 283,583
Claims priority, application Japan, June 4, 1962, 37/23,070
7 Claims. (Cl. 260—239.5)

The present invention relates to thiazolo[4',5'-11,12] steroids. More particularly, it relates to 2'-di(lower)alkylaminothiazolo[4',5'-11,12]pregn-11-ene-3,20-diol and 3,20-di(lower)alkanoate thereof.

The said thiazol[4',5'-11,12]steroid is represented by the formula:

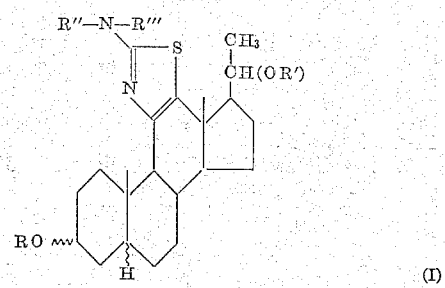

wherein R and R' each represents a hydrogen atom or a lower alkanoyl group (e.g. acetyl, propionyl, butyryl, valeryl), R'' and R''' each represents a lower alkyl group (e.g. methyl, ethyl, propyl, butyl, pentyl) and the ripple mark (ξ) represents α- or β-configuration.

The thiazolo[4',5'-11,12]steroid (I) is prepared from 11-oxo-12α-thiocyanatopregnane-3,20-diol or its 3,20-di(lower)alkanoate as shown in the following formulae:

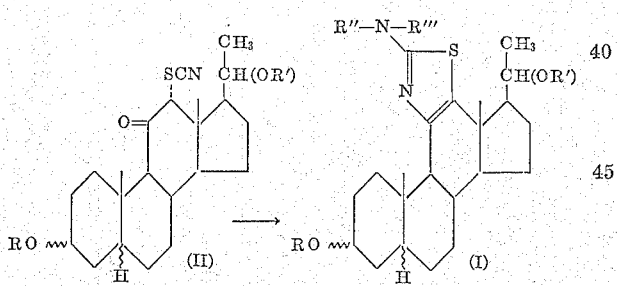

The starting 11-oxo-12α-thiocyanatosteroid (II) can be prepared by treating 11β,12β-epoxypregnane-3,20-diol 3,20-di(lower)alkanoate [Callow et al.: J. Chem. Soc., 4744 (1956); Julian et al.: U.S. Patent 2,940,991; Fried et al.: U.S. Patent 2,973,377] with thiocyanic acid according to a per se conventional manner [Loechel et al.: U.S. Patent 2,982,777] and oxidizing the resultant 11β-hydroxy-12α-thiocyanatopregnane-3,20-diol 3,20-di(lower)alkanoate with chromic acid in acetic acid, if necessary, followed by hydrolyzing the resulting 11-oxo-12α-thiocyanatopregnane-3,20-diol 3,20-di(lower)alkanoate with an alkaline substance (e.g. potassium carbonate, potassium bicarbonate, sodium carbonate) to 11-oxo-12α-thiocyanatopregnane-3,20-diol.

The conversion of the 11-oxo-12α-thiocyanatosteroid (II) into the thiazolo[4',5'-11,12]steroid (I) is accomplished by reacting the former with di(lower)alkylamine (e.g. dimethylamine, diethylamine) in an inert organic solvent medium (e.g. dioxane, tetrahydrofuran) at a temperature from 50 to 150° C., if necessary, in a sealed vessel. Usually, the reaction is executed by heating on a steam bath for 10 to 20 hours. When 2'-di(lower)alkylaminothiazolo[4',5'-11,12]pregn-11-ene-3,20-diol 3,20-di(lower)alkanoate is obtained as the reaction product, it may be further treated with an alkaline substance (e.g. potassium carbonate, potassium bicarbonate, sodium carbonate) according to a conventional hydrolyzing procedure to give 2'-di(lower)alkylaminothiazolo[4',5'-11,12]pregn-11-ene-3,20-diol.

The thus-produced thiazolo[4',5'-11,12]steroid (I) is useful as an anti-progestational agent. For instance, intrauterine injection of 2'-diethylaminothiazolo[4',5'-11,12]-5α-pregn-11-ene-3β,20β-diol to rats, 2.5 milligrams per horn, produces significant inhibition of progestational response induced by 4 milligrams of progesterone treated subcutaneously.

A presently-preferred embodiment of the present invention is illustratively shown in the following example.

Example

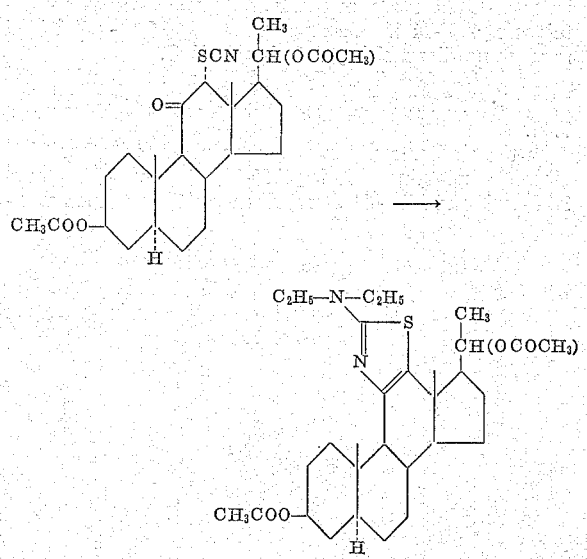

To a solution of 11-oxo-12α-thiocyanato-5α-pregnane-3β,20β-diol 3,20-diacetate (303 mg.) in dioxane (3.3 ml.), there is added diethylamine (211 mg.), and the resultant mixture is reacted at 100° C. for 17 hours in a steel bomb (15 ml.). The reaction mixture is combined with water and shaken with ether. The ether layer is washed with water, dried over anhydrous sodium sulfate and evaporated to give an oily substance (323 mg.). The oily substance is crystallized from methanol to give 2'-diethylaminothiazolo[4',5'-11,12]-5α-pregn-11-ene-3β,20β - diol 3,20-diacetate (213 mg.) as needles melting at 178 to 180° C.

*Analysis.*—Calcd. for $C_{30}H_{46}O_4N_2S$: C, 67.89; H, 8.74; N, 5.28; S, 6.03. Found: C, 67.62; H, 8.76; N, 5.57; S, 5.70.

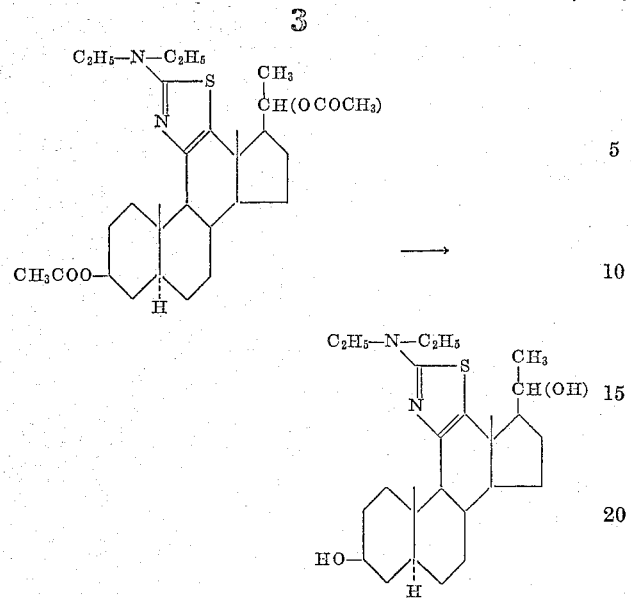

To a solution of the above prepared 2'-diethylaminothiazolo[4',5'-11,12]-5α-pregn-11-ene-3β,20β-diol 3,20-diacetate (137 mg.) in methanol (18 ml.), there is added a solution of potassium carbonate (538 mg.) in water (3.5 ml.), and the resultant mixture is refluxed for 2.5 hours. After cooling, the reaction mixture is combined with water and shaken with a mixture of chloroform and ether (1:4). The organic solvent layer is washed with water, dried over anhydrous sodium sulfate and evaporated to give an oily substance (120 mg.). The oily substance is chromatographed on neutral alumina (2.5 g.) and eluted with benzene-chloroform (9:1~1:1) chloroform. The eluate is crystallized from methanol to give 2'-diethylaminothiazolo[4',5'-11,12]-5α-pregn-11-ene-3β,20β-diol (95 mg.) as needles melting at 196 to 197° C.

*Analysis.*—Calcd. for $C_{26}H_{40}O_2N_2S$: C, 69.92; H, 9.48; N, 6.27; S, 7.16. Found: C, 69.36; H, 9.53; N, 6.40; S, 7.44.

In the similar manner, there are produced other 2'-di(lower)alkylaminothiazolo[4',5'-11,12]pregn-11-ene-3,20-diols and 3,20-di(lower)alkanoate thereof such as 2'-dimethylaminothiazolo[4',5'-11,12]-5α-pregn-11-ene-3β,20β-diol, 2'-dimethylaminothiazolo[4',5'-11,12]-5β-pregn-11-ene-3α,20α-diol, 2'-dimethylaminothiazolo[4',5'-11,12]-5β-pregn-11-ene-3α,20β-diol, 2'-diethylaminothiazolo[4',5'-11,12]-5β-pregn-11-ene-3α,20α-diol, 2'-dipropylaminothiazolo[4',5'-11,12]-5α-pregn-11-ene-3β,20β-diol, 2'-methylethylaminothiazolo[4',5'-11,12]-5α-pregn-11-ene-3β,20β-diol, 2'-dimethylaminothiazolo[4',5'-11,12]-5β-pregn-11-ene-3α,20α-diol 3,20-diacetate, 2'-dimethylaminothiazolo[4',5'-11,12]-5β-pregn-11-ene-3α,20α-diol 3,20-dipropionate and 2'-diethylaminothiazolo[4',5'-11,12]-5β-pregn-11-ene-3α,20β-diol 3,20-dipropionate

What is claimed is:
1. A compound of the formula:

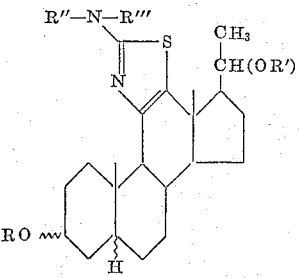

wherein R and R' each is a member selected from the group consisting of hydrogen and lower alkanoyl and R" and R''' each is lower alkyl.

2. 2'-di(lower)alkylaminothiazolo[4',5'-11,12]pregn-11-ene-3,20-diol.

3. 2'-di(lower)alkylaminothiazolo[4',5'-11,12]-5α-pregn-11-ene-3β,20β-diol.

4. 2'-diethylaminothiazolo[4',5'-11,12]-5α-pregn-11-ene-3β,20β-diol.

5. 2'-di(lower)alkylaminothiazolo[4',5'-11,12]pregn-11-ene-3,20-diol 3,20-di(lower)alkanoate.

6. 2'-di(lower)alkylaminothiazolo[4',5'-11,12]-5α-pregn-11-ene-3β,20β-diol 3,20-di(lower)alkanoate.

7. 2'-diethylaminothiazolo[4',5'-11,12]-5α-pregn-11-ene-3β,20β-diol 3,20-diacetate.

No references cited.